June 12, 1962  J. H. OCHS  3,038,608
LIQUID TREATING PROCESS AND APPARATUS
Filed Oct. 13, 1958
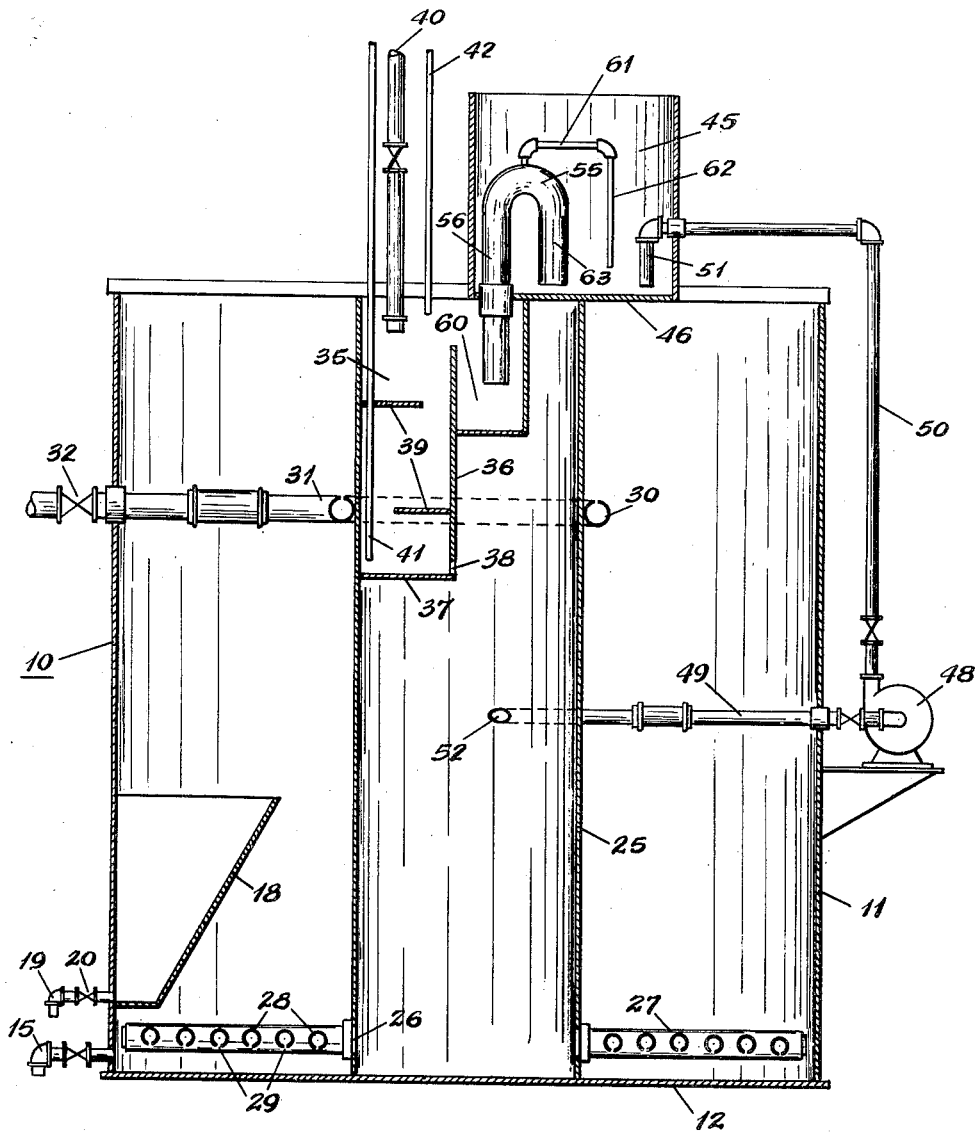

United States Patent Office 3,038,608
Patented June 12, 1962

3,038,608
LIQUID TREATING PROCESS AND APPARATUS
John H. Ochs, Tucson, Ariz., assignor to Infilco Incorporated, Tucson, Ariz., a corporation of Delaware
Filed Oct. 13, 1958, Ser. No. 766,925
8 Claims. (Cl. 210—84)

This invention relates to the operation of what is commonly called sludge-blanket clarifiers and in particular to sludge-blanket clarifiers of the type wherein a flow of raw water or other liquid to be treated is periodically introduced into the bottom portion of a treating basin at a high rate of flow to expand the sludge blanket.

It is an object of the invention to provide improved means for controlling the method of operation of a sludge blanket clarifier of this general type.

Another object of the invention is to provide improved means for, and method of, alternately expanding and allowing subsidence of a sludge blanket.

Another object is to operate a sludge blanket clarifier of the type referred to in such manner as to provide intervals between expansions of uniform and controllable length.

Other objects will become apparent upon consideration of the detailed description and the claims which follow.

In a sludge blanket clarifier of the type referred to, the high rate of flow into the bottom portion of the basin is employed to expand the sludge blanket and uniformly suspend all of the particles throughout the sludge blanket. After this uniform condition in the blanket has been attained, the flow into the bottom portion of the basin is arrested and the particles are permitted to settle under relatively quiescent conditions.

One type of apparatus used for treating liquids in this manner includes a tank having an inlet manifold extending into it along a center line of the tank near its base. The inlet manifold is connected to the base portion of an upstanding tube or column which is placed exteriorly of the tank. Liquid to be treated is continuously delivered to a collection chamber which is suddenly emptied through the column into the inlet manifold by well known siphon means each time a predetermined volume has collected in the chamber. This sudden discharge of batches of the liquid to be treated at a velocity considerably higher than the settling rate of the sludge particles results in a substantially uniform distribution of the sludge particles throughout the expanded blanket.

I have found that with this type of operation of a sludge blanket clarifier, it is an essential requirement that the expansions of the blanket are sufficiently frequent to keep the blanket expanded and never allow it to settle completely. The intervals of time between successive expansions of the sludge blanket should be such as to keep the blanket properly expanded on an average; they should also be adjustable to the specific needs of individual installations.

The treatment methods previously used, while producing fairly satisfactory results with equipment which is inexpensive as compared to other more elaborate types of sludge-blanket clarifiers, does not satisfy these requirements, due to the fact that the operation depends upon the rate of flow of the incoming liquid to be treated. Since this rate of flow may vary considerably from time to time, the periods from one expansion of the sludge blanket to the other will vary accordingly and the sludge blanket will not be kept in proper suspension. Also, I have found that the velocity and frequency of discharge required to expand the sludge blanket sufficiently to obtain uniform particle suspension is such that even with a maximum rate of flow of incoming liquid to be treated, the collection chamber would not fill as quickly as desirable for optimum operation. As will become apparent hereinafter, I have found that a collection chamber holding the required quantity of liquid to build up the head necessary to produce the required velocity for proper expansion of the blanket, should be filled many times faster than ordinary rates of flow of the liquid to be treated will fill it.

The invention will be more readily understood by reference to the drawing showing an apparatus according to the invention in vertical cross-section.

The apparatus comprises a tank 10 of suitable shape, such as, for example, square, round, or rectangular. The tank 10 has a side wall or walls 11 and a substantially flat bottom 12. A valved drain pipe 15 leads from the lower portion of the tank 10 and permits draining the tank for inspection or repair. A solids concentrator 18 is provided in the lower portion of the tank 10, as shown. A solids discharge pipe 19, provided with a valve 20, leads from a lower portion of the concentrator 18 to outside the tank 10.

Within the tank 10 is a vertically extending partition or column 25, preferably in the form of a tube. While the partition 25 is shown in the drawing as axially aligned in the tank 10, it can be mounted in any convenient location inside or outside the tank 10. The partition may be supported by any suitable means, such as legs, or, as shown, by the tank bottom 12, and it extends to the top of the tank. If the partition does not extend to the bottom 12, then its lower end must be closed. The lower part of the tube 25 is provided with ports 26. Headers 27 are connected to the column 25 and are in hydraulic communication with the space therein through the ports 26. A plurality of liquid distributing arms 28 having downwardly discharging outlets or orifices 29 extend from both sides of the headers 27 across the tank 10. A tubular effluent launder 30 having orifices in the top is supported by the tube 25. An effluent conduit 31, provided with a valve 32, extends from the launder 30 to outside the tank 10.

Within the upper portion of the tube 25 an open top inlet chamber 35 is formed by an upstanding wall 36 and a flat bottom 37 affixed to the inside of the tube. An outlet port 38 is arranged to discharge liquid from the inlet chamber 35 tangentially to the opposite portion of the tube 25. A plurality of vertically spaced horizontal baffles 39 are mounted in the inlet chamber 35, as shown. A valved liquid inlet pipe 40 discharges into the upper portion of the chamber 35, and a chemical feed pipe 41 discharges near the bottom of the chamber 35. A second chemical feed pipe 42 may discharge in the upper part of the inlet chamber 35, as shown.

A siphon compartment or chamber 45 having a substantially flat bottom 46 is mounted on top of the tank 10 by any suitable means, such as a bridge across the tank, not shown. Liquid from the tank 10 is pumped into the siphon chamber 45 by a pump 48 which may be supported on a bracket fixed to the wall of tank 10 or on the floor supporting tank 10. The pump 48 has a suction line 49 extending through the wall of the tank 10, and a valved discharge line 50 leading into the siphon chamber 45. The discharge line 50 has a depending portion 51 discharging onto the bottom 46 of the chamber 45. Liquid may be pumped from one or more points of the outer portion of the tank 10; preferably, however, the line 49 extends into the tube 25 and has an inlet 52 at an elevation spaced below the port 38 of the inlet chamber 35, as shown.

Liquid in the chamber 45 is discharged by means of a siphon pipe 55. The long leg 56 of the siphon pipe extends from the siphon chamber 45 into a stilling compartment 60, which forms a liquid seal for the leg 56, and liquid overflows therefrom into inlet chamber 35. The siphon pipe 55 is of a sufficiently large diameter to be able to rapidly empty the chamber 45. A smaller diameter pipe 61 has a depending leg 62 which terminates slightly above the lower ends of the short leg 63 of the siphon pipe 55 and of the depending portion 51 of the discharge line 50. This arrangement assures that the short leg 63 of the siphon pipe 55 is always sealed in liquid.

In operation the liquid to be treated continuously enters the inlet chamber 35 through valved inlet pipe 40. Any chemicals used in the treatment are also introduced into the inlet chamber. If lime is used, it will be discharged near the bottom of the chamber 35 through chemical feed pipe 41. Other chemicals, such as chlorine or coagulant, are preferably introduced by means of chemical feed pipe 42.

The pump 48 continuously withdraws liquid from the tube 25 and discharges it into the siphon chamber 45 at a rate considerably in excess of the rate of inflow of newly entering liquid. When the liquid in the siphon chamber has reached the proper level relative to the submergence of the end of the long leg 56 of the siphon pipe, it starts to flow through the siphon pipe 55 and through the stilling chamber 60 into the inlet chamber 35, where it mingles with the incoming liquid and chemicals. As the liquid passes over and around the baffles 39, more mixing takes place and air entrained in the liquid is released and escapes through the open top of the inlet chamber 35.

The mixture of liquid discharged from the siphon chamber 45, newly entering liquid, and chemicals is discharged through port 38 into the tube 25 and spirals downwardly to the ports 26.

Because of the large diameter of siphon pipe 55, the siphon chamber 45 will be drained rapidly. Due to this sudden discharge of a large quantity of liquid into the liquid in the inlet chamber 35 and the tube 25, a head of several inches of liquid is built up in the tube 25 over the head outside of the tube. This head forces the liquid at high velocity through the headers 27 and distributing pipes 28 and upwardly through the sludge blanket, expanding the blanket and suspending the sludge particles uniformly. Clarified liquid is withdrawn through the launder 30 and effluent conduit 31.

When the siphon chamber 45 is drained down to the lower end of pipe 62, the siphon is broken; thereupon the liquid level in the tube 25 drops to the elevation of the liquid surface outside the tube and the upflow of liquid through the sludge blanket stops. A new cycle of expansion of the sludge blanket is initiated when the siphon chamber 45 has been filled again by the pump 48 to the level where water begins to flow through the siphon pipe 55.

The inlet end of the suction pipe 49 is at an elevation sufficiently spaced below the port 38 that the reactions between the liquid and the chemicals are substantially completed before the liquid can enter the pump suction line 49. Thus the pump 48 circulates liquid containing solid reaction products and any solids formed by afterprecipitation occurring in the suction line 49 or discharge line 50 or in the pump 48 will be deposited on the previously precipitated solids. In this manner deposition in the pump and pipes with resultant clogging are prevented.

The average depth of the sludge blanket is kept at a desired value in known manner by withdrawing solids in suitable quantity from the concentrator 18 through solids discharge pipe 19.

It will be seen that with a rate of liquid withdrawal from the tube 25 by the pump 48 of, for example, 8 times the rate of flow of the incoming liquid to be treated, collection of such liquid in the siphon chamber 45 until the siphon is primed, and discharge of the collected liquid through the distributor arms 27 at a velocity say, for example, 25 times greater than that of the newly incoming liquid, the sludge blanket is kept in suspension in a manner that would not be possible if the incoming raw water were used to fill the siphon chamber. Also, the length of the intervals between discharges will not vary as it might if the incoming liquid to be treated were used to fill the siphon chamber 45, and the cycles of operation may continue even though the flow of incoming liquid is interrupted.

The length of the intervals between expansions can be controlled by selection of a pump of suitable capacity to fit the requirements of individual installations, or by positioning the valve on pump discharge line 50 to more or less throttle the pump discharge. The extent to which the blanket is expanded also can be adjusted to the needs of each individual installation by using a siphon tank of suitable size, and this can be done without influencing the length of the intervals between expansions, as the pump capacity can be selected so that the siphon tank will be filled in a predetermined period of time, whatever the size of the siphon tank. Another way of controlling the extent of blanket expansion is by choosing a suitable vertical length of leg 62 of pipe 61. This method of control permits to vary the volume of discharge with a given tank and pump, without disturbing the short leg 63 of the siphon pipe 55, whose lower end thus always remains near the bottom 46 of chamber 45, thereby preventing the accumulation of solids in chamber 45.

I claim:

1. A sludge blanket clarifier comprising a tank, an overflow from said tank, means for withdrawing excess solids from a lower portion of said tank, a column extending to an elevation above said overflow, said column being closed at its bottom, a plurality of liquid distributing arms in the lower portion of said tank and in hydraulic communication with said column, liquid discharge means from said arms, inlet means for introducing liquid to be treated into an upper portion of said column, a siphon chamber, a pump having a suction inlet in said column and a discharge outlet in said siphon chamber, said pump having a capacity to withdraw liquid from said column at a rate several times the rate of inflow of liquid to be treated, and a siphon pipe having its intake in said siphon chamber and a liquid sealed outlet in said column at an elevation spaced above said suction inlet and being of sufficiently large diameter to rapidly drain the content of said siphon chamber.

2. A sludge blanket clarifier comprising a tank, an overflow for treated liquid from said tank, means for withdrawing excess solids from a lower portion of said tank, a tube in said tank and extending from its bottom to above said overflow, a plurality of liquid distributing arms extending from said tube across said tank and in hydraulic communication with said tube, liquid discharge means from said arms, an inlet chamber in the upper portion of said tube, means for introducing liquid to be treated and chemicals into said inlet chamber, an outlet port from said inlet chamber to said tube, a siphon chamber outside said tank, a pump having a suction inlet in said tube at an elevation spaced below said port and a discharge outlet in said siphon chamber, and a siphon pipe having its intake in said siphon chamber and its outlet in said inlet chamber and having a sufficiently large diameter to drain said siphon chamber at a volume rate of flow far in excess of the rate of flow of the incoming water.

3. The apparatus of claim 2, wherein said port discharges tangentially to said tube.

4. The apparatus of claim 2, including baffles in said inlet chamber, whereby air entrained in said siphon pipe is released from the liquid.

5. A sludge blanket clarifier comprising a tank, outlet means for clarified liquid from an upper portion of said tank establishing a liquid level therein, solids withdrawal means leading from a lower portion of said tank, a partition in said tank and extending to an elevation above the liquid level established by said outlet means, a plurality of distributing conduits extending from said partition across a lower portion of said tank and in hydraulic communication with the space within said partition, liquid discharge means spaced along said conduits, an inlet chamber occupying an upper portion of the space within said partition and having an outlet port to the space within said partition, means for introducing liquid to be treated into said inlet chamber, a siphon chamber, a pump having a pumping capacity several times the quantity of the incoming liquid to be treated and having a suction inlet inside said partition and an outlet discharging into said siphon chamber, and means adapted to rapidly drain the contents of said siphon chamber into said inlet chamber.

6. In the method of operating a sludge blanket clarifier wherein the sludge blanket is alternately expanded by discharging liquid to be clarified upwardly therethrough at a high velocity, substantially in excess of the average settling rate of sludge particles in said blanket, and allowed to contract by substantially stopping the flow of liquid to be clarified through the blanket, the improvement comprising controlling the length of the intervals between expansions independently of the rate of inflow of liquid to be treated by withdrawing liquid from a point in said clarifier upstream of said sludge blanket, storing said withdrawn liquid and using said withdrawn liquid as the liquid which is discharged at high velocity upwardly through said sludge blanket, the rate of withdrawal of liquid being independent of and several times the rate of inflow of liquid to be treated and adjusted to obtain a sufficient quantity of stored liquid for said high velocity discharge through said blanket at intervals of set length.

7. In a sludge blanket clarifier including a tank having liquid outlet means establishing a liquid level therein, means for withdrawing solids from a lower portion of said tank, liquid distributing means in the lower portion of said tank, a column extending vertically to above the elevation of said liquid level, said column being closed at its bottom and in hydraulic communication with said tank through said liquid distributing means, inlet means for introducing liquid to be treated into an upper portion of said column, and means for cyclically expanding said sludge blanket by periodically and rapidly discharging sufficient liquid into said column to create a head of liquid inside said column over the head in said tank outside said column, said means including a chamber for accumulating the liquid to be discharged into said column and means for rapidly discharging said accumulated liquid into said column, the combination with said means for cyclically expanding said sludge blanket of means for regulating the intervals between expansions comprising means for withdrawing liquid from said clarifier and discharging it into said chamber at a rate which is independent of and several times the rate of inflow of liquid to be treated and adjusted to obtain a sufficient quantity of accumulated liquid for said high velocity discharge through said blanket in intervals of set length.

8. In a sludge blanket clarifier of the type including a tank having liquid outlet means, means for withdrawing solids from a lower portion of said tank, liquid distributing means in the lower portion of said tank, a column extending vertically to an elevation above said outlet means, said column being closed at its bottom and in hydraulic communication with said tank through said liquid distributing means, inlet means for liquid to be treated, a chamber receiving the liquid to be treated, the size of said chamber being sufficient to hold a quantity of liquid which, by its rapid discharge into said column, creates a head of liquid inside said column over the head in said tank outside said column, and means for rapidly discharging said quantity of liquid from said chamber into said column, the improvement comprising means for discharging the incoming liquid to be treated directly into said column, and means withdrawing liquid from said column and introducing it into said chamber at a rate independent of and several times the rate of discharge of incoming liquid to be treated into said column.

References Cited in the file of this patent
UNITED STATES PATENTS

| | | |
|---|---|---|
| 753,880 | Greth | Mar. 8, 1904 |
| 1,721,797 | Taylor | July 23, 1929 |
| 2,325,679 | Hughes | Aug. 3, 1943 |
| 2,355,069 | Green | Aug. 8, 1944 |
| 2,565,321 | Petersen | Aug. 21, 1951 |
| 2,860,785 | Gardner | Nov. 18, 1958 |